US012115538B2

(12) United States Patent
McDonagh et al.

(10) Patent No.: US 12,115,538 B2
(45) Date of Patent: Oct. 15, 2024

(54) SYSTEM FOR TIRE PARTICLE CAPTURE

(71) Applicant: INTERNATIONAL BUSINESS MACHINES CORPORATION, Armonk, NY (US)

(72) Inventors: James McDonagh, Frodsham (GB); Malgorzata Jadwiga Zimon, Warrington (GB); Breanndan O'Conchuir, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 17/412,640

(22) Filed: Aug. 26, 2021

(65) Prior Publication Data
US 2023/0069677 A1   Mar. 2, 2023

(51) Int. Cl.
*B03C 3/155* (2006.01)
*B03C 3/12* (2006.01)
(Continued)

(52) U.S. Cl.
CPC ............... *B03C 3/155* (2013.01); *B03C 3/12* (2013.01); *B03C 3/41* (2013.01); *B03C 2201/30* (2013.01)

(58) Field of Classification Search
CPC .. B03C 3/47; B03C 3/155; B03C 3/45; B03C 3/68; B03C 3/82; B03C 3/86; B03C 3/04;
(Continued)

(56) References Cited

U.S. PATENT DOCUMENTS

| 7,094,268 | B2 | 8/2006 | Krantz |
| 10,352,854 | B2 | 7/2019 | Mathissen |

(Continued)

FOREIGN PATENT DOCUMENTS

| DE | 102019101057 B3 | 7/2020 | |
| DE | 102019209793 A1 | 1/2021 | |
| EP | 1256739 A2 * | 11/2002 | ............ F16D 65/00 |
| WO | 2020078577 A1 | 4/2020 | |
| WO | 2020200761 A1 | 10/2020 | |

(Continued)

OTHER PUBLICATIONS

Dockrill, "New Car Tyre Nanogenerators Can Convert Road Friction Into Usable Energy," ScienceAlert.com, [accessed Jul. 7, 2021], 4 pgs., Retrieved from the Internet: <https://www.sciencealert.com/new-car-tyre-nanogenerators-can-convert-road-friction-into-useable-energy>.

(Continued)

*Primary Examiner* — Christopher P Jones
*Assistant Examiner* — Sonji Turner
(74) *Attorney, Agent, or Firm* — Caleb D. Wilkes

(57) ABSTRACT

A method and a system are provided for capturing particle emissions from a tire of a vehicle. The system includes a triboelectric generator configured to generate an electric current. The system includes a capture surface configured to have an electric field. The system includes a first electrical connecting line connecting the triboelectric generator to the capture surface. The first electrical connecting line is configured to pass to the capture surface the electric current generated via the triboelectric generator. The passed electric current is used by the capture surface to generate the electric field. The system includes a set of filters attached to the capture surface. A computer program product is also provided which may cause a computer system to adjust a supplementary power flow to the capture surface based on a control signal that is received.

20 Claims, 11 Drawing Sheets

(51) Int. Cl.
*B03C 3/41* (2006.01)
*B03C 3/47* (2006.01)

(58) Field of Classification Search
CPC .... B03C 3/08; B03C 3/10; B03C 3/40; B03C 3/366; B03C 2201/30; F16D 65/0081; F16D 65/0031; F16D 65/00; B01D 46/0032
See application file for complete search history.

(56) References Cited

U.S. PATENT DOCUMENTS

| | | | | |
|---|---|---|---|---|
| 2014/0338458 | A1* | 11/2014 | Wang | G01H 11/06 |
| | | | | 310/309 |
| 2017/0167975 | A1 | 6/2017 | Mathissen | |
| 2018/0205327 | A1* | 7/2018 | Wu | H02N 1/04 |
| 2020/0331005 | A1* | 10/2020 | You | B03C 3/47 |
| 2021/0008932 | A1* | 1/2021 | Stowell | H01Q 1/2241 |

FOREIGN PATENT DOCUMENTS

| | | | | |
|---|---|---|---|---|
| WO | WO-2021152331 | A1 * | 8/2021 | B03C 3/011 |
| WO | 2023025481 | A1 | 3/2023 | |

OTHER PUBLICATIONS

Felsing, et al., "A New Approach in Separating Microplastics from Environmental Samples Based on Their Electrostatic Behavior," Environmental Pollution, vol. 234, Mar. 2018, pp. 20-28.

Li, et al., "Carbon Captured From Vehicle Exhaust By Triboelectric Particular Filter as Materials for Energy Storage," Nano Energy, vol. 56, Feb. 2019, pp. 792-798.

Mao, et al., "Single-electrode Triboelectric Nanogenerator for Scavenging Friction Energy From Rolling Tires," Nano Energy, vol. 15, Jul. 2015, pp. 227-234.

Micro Plastic Removal Systems, "About the System," [accessed on Jul. 7, 2021], 6 pgs., Retrieved from the Internet: <https://microplasticremovalsystems.com/about-the-system/>.

Parker, et al., "Microplastic and Tire Wear Particle Occurrence in Fishes From an Urban Estuary: Influence of Feeding Characteristics on Exposure Risk," Nov. 2020, Marine Pollution Bulletin, vol. 160, pp. 1-11.

Sommer, et al., "Tire Abrasion as a Major Source of Microplastics in the Environment," Aerosol and Air Quality Research, ResearchGate, Aug. 2018, pp. 2014-2028, <https://www.researchgate.net/publication/326063101_Tire_Abrasion_as_a_Major_Source_of_Microplastics_in_the_Environment>.

Thetyrecollective.com, "The Tyre Collective," [accessed Jul. 7, 2021], 7 pgs., Retrieved from the Internet: <https://www.thetyrecollective.com/>.

Mell et al., "The NIST Definition of Cloud Computing", National Institute of Standards and Technology, Special Publication 800-145, Sep. 2011, 7 pages.

International Searching Authority, "International Search Report and Written Opinion of the International Searching Authority", International Application No. PCT/EP2022/070498, Mailed: Nov. 22, 2022, 15 pages.

Kang et al., "Cylindrical Free-Standing Mode Triboelectric Generator for Suspension System in Vehicle," Micromachines 2019, 10(1), 17; https://doi.org/10.3390/mi10010017, Dec. 29, 2018, 9 pages.

* cited by examiner

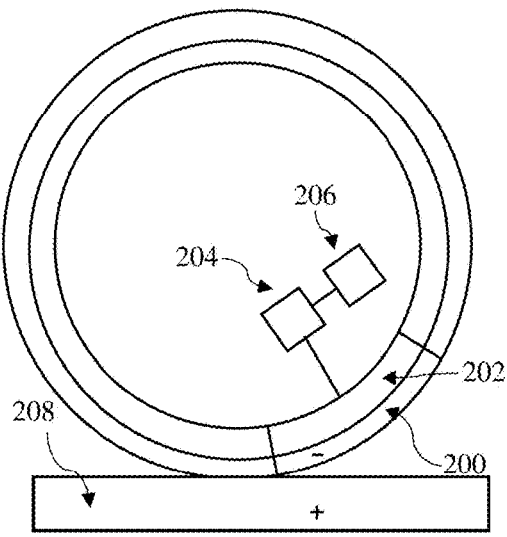 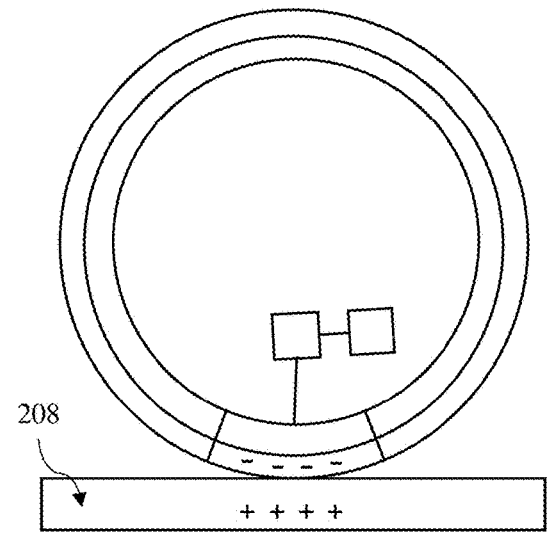
FIG. 2a                 FIG. 2b
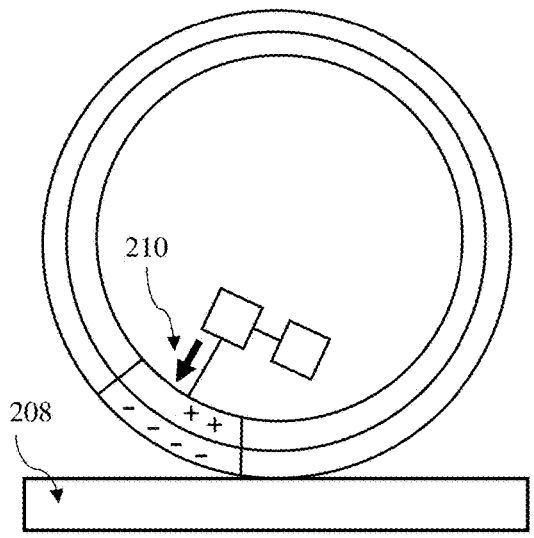 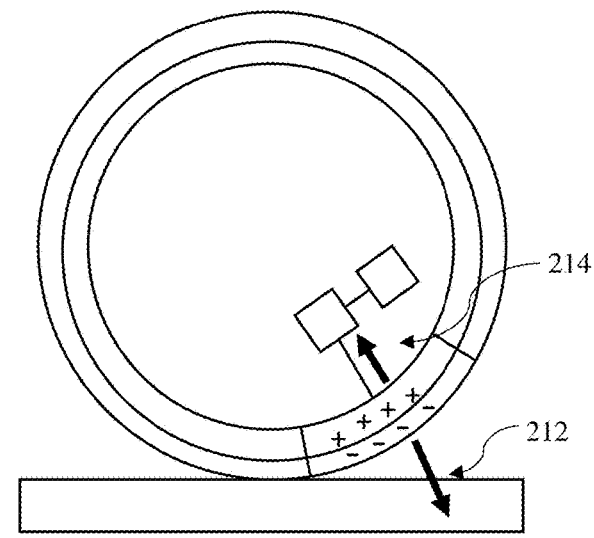
FIG. 2c                 FIG. 2d

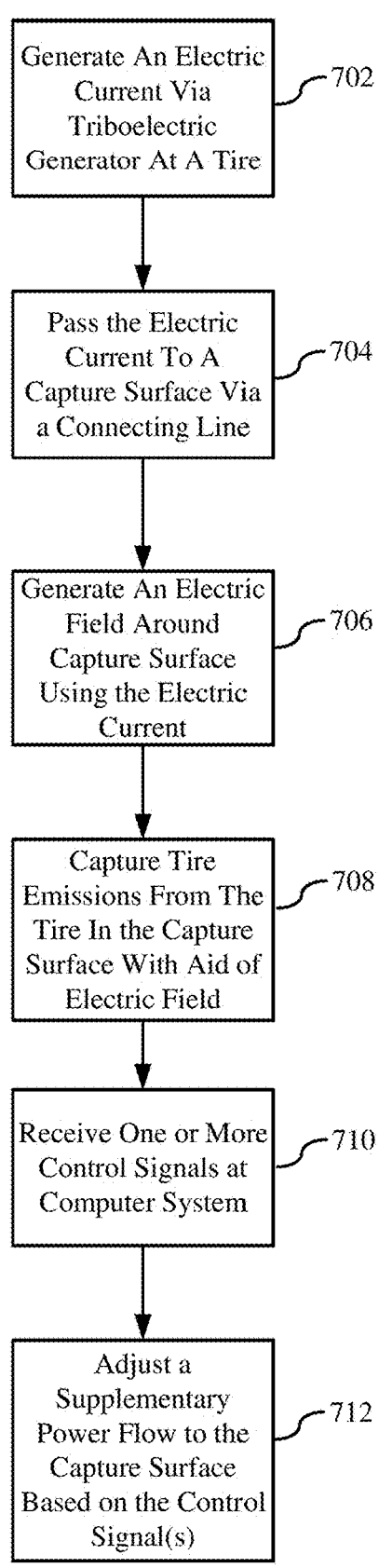
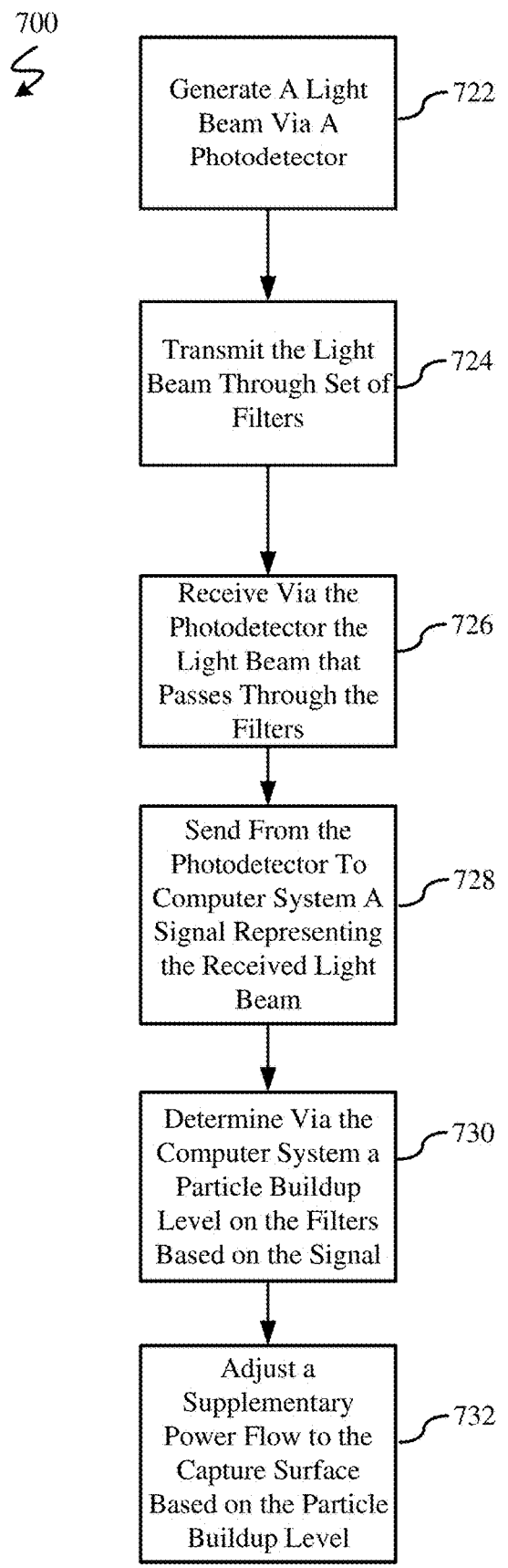
FIG. 7a
FIG. 7b

SYSTEM FOR TIRE PARTICLE CAPTURE

BACKGROUND

The present invention relates to capturing vehicle pollution by capturing tire particle emissions.

SUMMARY

According to one exemplary embodiment, a system for capturing particle emissions from a tire of a vehicle is provided. The system includes at least one triboelectric generator configured to generate an electric current. The system includes at least one capture surface configured to have an electric field. The system includes a first electrical connecting line connecting the at least one triboelectric generator to the at least one capture surface. The first electrical connecting line is configured to pass to the capture surface the electric current generated via the triboelectric generator. The passed electric current is used by the capture surface to generate the electric field. The system includes a set of filters attached to the capture surface. A method corresponding to the above system is also disclosed herein.

A computer program product related to the corresponding system is also disclosed herein. The computer program product may include program instructions that are executable by a computer system to cause the computer system to perform a method that includes receiving one or more control signals and adjusting a supplementary power flow to the at least one capture surface based on the one or more control signals.

DESCRIPTION OF THE DRAWINGS

Embodiments of the present invention will now be described, by way of example only, with reference to the following figures:

FIG. 2a is a schematic diagram of a portion of the system for a first rotational position of the tire;

FIG. 2b shows the schematic diagram of the portion of the system shown in FIG. 2a for a second rotational position of the tire;

FIG. 2c shows the schematic diagram of the portion of the system shown in FIGS. 2a and 2b for a third rotational position of the tire;

FIG. 2d shows the schematic diagram of the portion of the system shown in FIGS. 2a, 2b, and 2c where the system has returned to the first rotational position that was shown in FIG. 2a;

FIG. 7a is an operational flowchart illustrating a tire particle emission capture process according to at least one embodiment;

FIG. 7b is an operational flowchart illustrating a photodetector-aided electric field strength adjustment process according to at least one embodiment;

DETAILED DESCRIPTION

Disclosed herein is a system and a computer program product for capturing tire particle emissions using a triboelectric generator and a capture plate.

The triboelectric effect occurs between two surfaces with different electrical polarities. When the two surfaces are in contact with each other, the electron charges of the two surfaces are disrupted. This disruption results in a potential difference between the two surfaces. A triboelectric generator harnesses the triboelectric effect to produce an alternating current. This harnessing is achieved by attaching one or both of the two surfaces to electrode layers. The electrode layers provide electrons that flow to and from the two surfaces to achieve electrical equilibrium between the disrupted surface charges. The flow of electrons in the triboelectric generator drives an alternating current that can be stored in a storage unit, e.g., in a battery, or can be used for powering electric devices or for generating an electric field.

Figure 1:
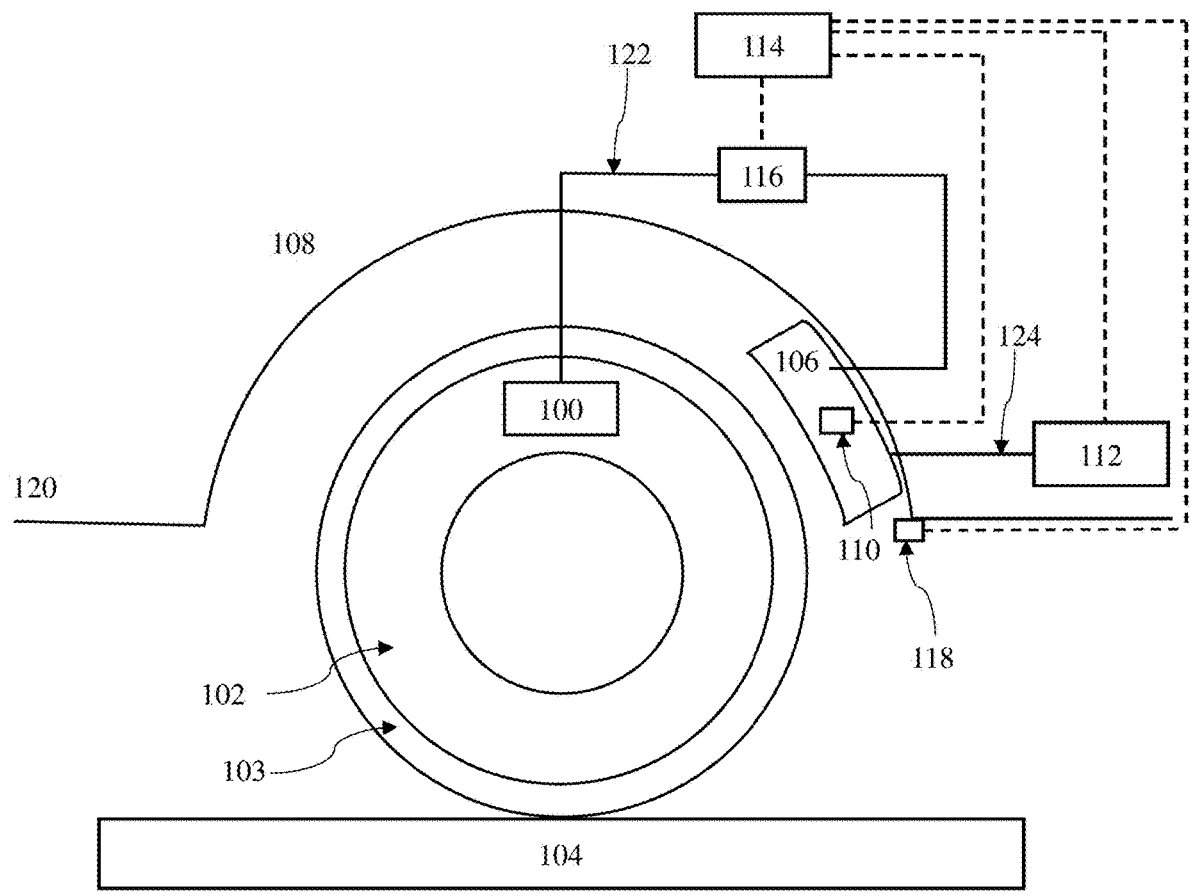
FIG. 1 is a schematic diagram of a system which captures tire particle emission using a triboelectric generator and a capture plate.

FIG. 1 is a cross-sectional diagram of an embodiment of the present invention. A triboelectric generator 100 is embedded into a first tire 102 which bears a vehicle body 120 of a vehicle. The surface 103 of the first tire 102 includes a material with a high electron affinity. The triboelectric generator 100 may operate to generate electricity when the surface 103 is in contact with a ground surface 104 and when the first tire 102 is rotating and/or sliding/moving. The triboelectric generator 100 may be embedded in the first tire 102 and is connected to a capture surface 106. The triboelectric generator 100 is operable to provide power to the capture surface 106. A first electrical connecting line 122 may connect the triboelectric generator 100 to the capture surface 106 and may be configured to pass electric current from the triboelectric generator 100 to the capture surface 106. This electric current may be considered a primary power for the capture surface 106 and the triboelectric generator 100 may be considered a primary power source for the capture surface 106. A set of filters (shown in FIGS. 3 and 4) may be attached to the capture surface 106. The capture surface 106 may be part of a structure such as a plate. The structure may be attached underneath a wheel arch 108 of the vehicle body 120. The capture surface 106 may be formed of a material such as metal which is a conductor of electric current, e.g., a strong conductor of electric current.

A photodetector 110 may be connected to the set of filters. The photodetector 110, as will be explained with respect to FIG. 4, may be configured to transmit and capture light beams and use the captured light beams to monitor a particle buildup level of the set of filters. When the set of filters is saturated, additional particle capture with the set of filters is more challenging or ineffective.

The capture surface 106 may be connected to a backup power source 112 that may be a battery. The backup power source 112 may be configured to provide power to the capture surface 106 via a second electrical connecting line 124. Thus, the backup power source 112 may act as a secondary power source which, as needed, supplements the power generated by the triboelectric generator 100. The computer system 114 may send signals to the backup power source 112 to control this supplemental power flow to the capture surface 106. The second electrical connecting line 124 may be formed of a metallic material capable of transmitting electric current. The second electrical connecting line 124 may be insulated to avoid charge loss along the path. In one embodiment, the second electrical connecting line runs along a minimum distance path between the backup power source 112 and the capture surface 106 so that length losses in current/voltage/power may be reduced.

The triboelectric generator 100, the capture surface 106, the photodetector 110, and the backup power source 112 may all be connected to the computer system 114. The computer system 114 may help monitor and interpret the electrical output of the triboelectric generator 100 and a particle buildup level on the set of filters and may help control supplemental power flow from the backup power source 112 that flows to the capture surface 106. The computer system 114 may include structure, programs, and components as described subsequently with respect to FIG. 8.

The first tire 102 rotates as the vehicle moves along the ground surface 104. As the first tire 102 rotates, the triboelectric generator 100 embedded in the first tire 102 converts the frictional energy generated between the surface 103 of the first tire 102 and the ground surface 104 contacting each other to produce an electric current. This movement of the first tire 102 while contacting the ground surface 104 may be referred to as frictional motion. The electric current powers the capture surface 106, such that a static electromagnetic field is produced around the capture surface 106.

A first electrical connecting line 122 may connect the triboelectric generator 100 to the capture surface 106. The first electrical connecting line 122 may be formed of a metallic material capable of transmitting electric current. The first electrical connecting line 122 may be insulated to avoid charge loss along the path. In one embodiment, the first electrical connecting line runs along a minimum distance path between the triboelectric generator 100 and the capture surface 106 so that length losses in current/voltage/power may be reduced.

In the shown embodiment, an output voltage sensor 116 measures a voltage output of the at least one triboelectric generator that is passed through the first electrical connecting line 22. This output voltage sensor may have a communicative connection to the computer system 114 as is indicated by the dotted lines. The output voltage sensor 116 may in one embodiment be a multimeter integrated into the first electrical connecting line 22. Other types of voltage sensors may alternatively be implemented as the output voltage sensor 116.

An electromagnetic field strength sensor 118 may include a probe and/or an antenna and may measure a strength of the electromagnetic field that is created around the capture surface 106. This electromagnetic field provides attraction to attract the tire particles that are emitted from the tire. The electromagnetic field strength sensor 118 may be designed to avoid perturbing the electromagnetic field and to avoid coupling and reflection as much as possible. The electromagnetic field strength sensor 118 may implement broadband measurements using a broadband probe that may include three independent diode detectors. The electromagnetic field strength sensor 118 may implement frequency selective measurements by having a field antenna and a frequency selective receiver or spectrum analyser allowing monitoring of a frequency range of interest. The probe and/or antenna may respond to fields only on one axis, or may be tri-axial, showing components of the field in three directions at once. The probes may be amplified and active to improve measurement precision and sensitivity. The electromagnetic field strength sensor 118 may have a communicative connection with the computer system 114 to provide signals representing the strength of the electromagnetic field around the capture surface 106.

FIGS. 2a to 2d illustrate how a triboelectric generator embedded into a tire produces an electric current in an embodiment of the invention. The triboelectric generator 100 embedded in the tire includes a tire surface first region 200 made from a material with strong electron attracting properties. This material is attached to a metal electrode layer 202 for charge collection. The metal electrode layer 202 is connected to an external load 204. The external load 204 is connected to a metal sheet 206. Although the triboelectric effect occurs continuously as the wheel rotates, FIGS. 2a to 2d shows the mechanics of the triboelectric effect of one section of the tire for illustrative purposes.

As the wheel rotates in FIG. 2a, the tire surface first region 200 which may be made of polymer is brought into contact with a first ground surface region 208. The entire outer surface of the tire may be a polymer layer. Electrons from the first ground surface region 208 are transferred to the tire surface first region 200. This transfer of electrons results in the tire surface first region 200 becoming negative and the first ground surface region 208 becoming positive. As the wheel further rotates in FIG. 2b, an electrical equilibrium is reached. As the wheel further rotates in FIG. 2c, the tire surface first region 200 that is negatively charged cannot be balanced by the first ground surface region 208. This inability for charge relief drives electrons 210 from the metal sheet 206 into the metal electrode layer 202. The metal electrode layer 202 is in contact with the tire surface first region 200. The metal electrode layer 202 thereby becomes positively induced. This driving and positive induction result in a negative current pulse.

FIGS. 2a-2d show the external load 204 and the metal sheet 206 as being disposed in a cavity of the wheel; however, the external load 204 and the metal sheet 206 may be disposed in other positions as long as a charge connection exists between them and the metal electrode layer 202. For example, a contact wire may provide this charge connection between the external load 204 and the metal electrode layer 202. Flexible contacts such as electrical motor brushes may enable the electrical connection between the external load 204 and the metal electrode layer 202. Transit of the charge from the metal electrode layer 202 to the external load 204 may occur via a suitable conducting material that is insulated from the environment to prevent charge loss. The route of such an electrical connecting line may be or include a minimum distance path between the metal electrode layer 202 and the external load 204.

The metal sheet 206 acts as a reference electrode in the system and may balance negative charges with respect to the triboelectric generator 100. This balancing may enable the creation of electrical current pulses.

When the wheel rotates and the tire surface first region 200 is brought back into contact with the ground surface again as shown in FIG. 2d this time at a ground surface second region 212 (because the vehicle has traveled a distance so that the tire surface first region 200 will contact the ground in a different area), all remaining negative static charge of the tire surface first region 200 will be released into the ground surface second region 212. This release unbalances the induced positive charges in the metal electrode layer 202. This unbalancing drives electrons back to the metal sheet 214. This driving results in a positive current pulse. As the wheel continues to rotate throughout a journey, the positive and negative electrical pulses result in a power output from the triboelectric generator 100. The power output can power electrical devices. In the present invention, the output voltage is monitored by the computer system 114 and the output voltage/electric current is sent to the capture surface 106 to power the static electromagnetic field used to attract tire particle emissions.

The first electrical connecting line 122 may connect to the triboelectric generator 100 by connecting to the external load 204 and/or to the metal sheet 206. The first electrical connecting line 122 may receive electric current in this manner and pass/transfer/transmit the electric current to the capture surface 106.

The resulting induced charge produced by the triboelectric generator 100 can be calculated using equation (1):

$$q = \int_a^b I dt \tag{1}$$

where q is the induced charge, I is the output current, t is the time and [a, b] is the time interval.

The electrical power output of the triboelectric generator 100, among other factors, depends on the speed of the rotation of the wheel. The relationship between the speed of rotation of the wheel and the peak voltage value of the power output may be linear. As the wheel spins faster, the additional frictional energy may be converted to an increased electric current and may be sent to the capture surface 106. The energetic return from the triboelectric effect is proportional to friction generated between the section of the surface of the tire and the ground surface. Therefore, the speed of rotation of the tire provides an automatic up and down scaling of the electromagnetic field strength of the capture surface 106 which may be part of a charge plate. This automatic scaling mechanism means that the higher amount of tire particles which are produced at a higher vehicle speed are captured, because the attractive strength of the capture surface 106 will increase as well.

The relationship between vehicle weight load and peak voltage value of the power output from the triboelectric generator 100 may be linear. As the vehicle weight load increases, more of the tire surface will contact the ground surface. This increase of contact area helps result in a larger potential difference and a larger resulting power output.

The resistance of the external load 204 impacts the output power of the triboelectric generator 100. For a triboelectric generator 100 using a polymer material of 1.5×3.5 cm² as an outer surface for contacting the ground, the optimal external load resistance embodied as the external load 204 may be 10 MΩ. The external load 204 may in some embodiments include a resistor. The external load 204 may in some embodiments include a material with a high impedance to the current. In some instances, an electric connecting line, e.g., the first electrical connecting line 122, for passing generated electric current to a particle capture surface may connect to the external load 204. The external load 204 may raise the impedance at that point in the circuit. The external load 204 may be an electrical load.

Figure 2E:
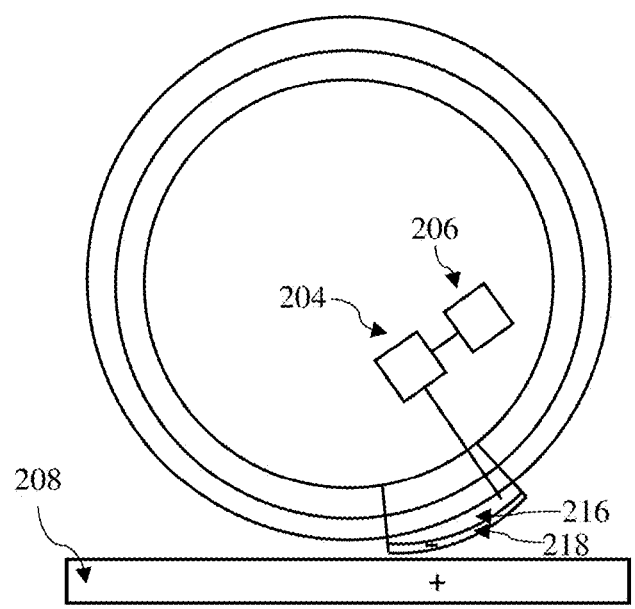
FIG. 2e shows the schematic diagram of a portion of an alternative embodiment of the system.

FIG. 2e shows a schematic diagram of a portion of an alternative embodiment of the system from a similar viewpoint as was shown for FIGS. 2a-2d. This alternative embodiment includes a triboelectric layer 218 added on to a foil 216. Both the triboelectric layer 218 and the foil 216 may be added onto an existing tire. The triboelectric layer 218 may include a flexible polymer with strong electron attracting ability. The triboelectric layer 218 may be a thin film formed with a roughened surface. This thin film may be formed by casting liquid flexible polymer material and a crosslinker onto sandpaper, letting the material dry, and then peeling off the dried layer from the sandpaper. Polydimethylsiloxane is an example of a flexible polymer that may be implemented as the triboelectric layer 218. The foil 216 may be made of a metal such as copper. Thus, this alternative embodiment may be implemented by installing the system components onto an existing vehicle and tire combination, e.g., by retrofitting the existing vehicle. This alternative embodiment may also include an external load 204 connected to a metal sheet 206. The external load may have an electric connection with the foil 216 to pass charges to and from the foil 216 that are achieved via the triboelectric effect. The external load 204 and the metal sheet 206 may have characteristics as were described above for their implementation in the embodiment shown in FIGS. 2a-2d.

Figure 3A:
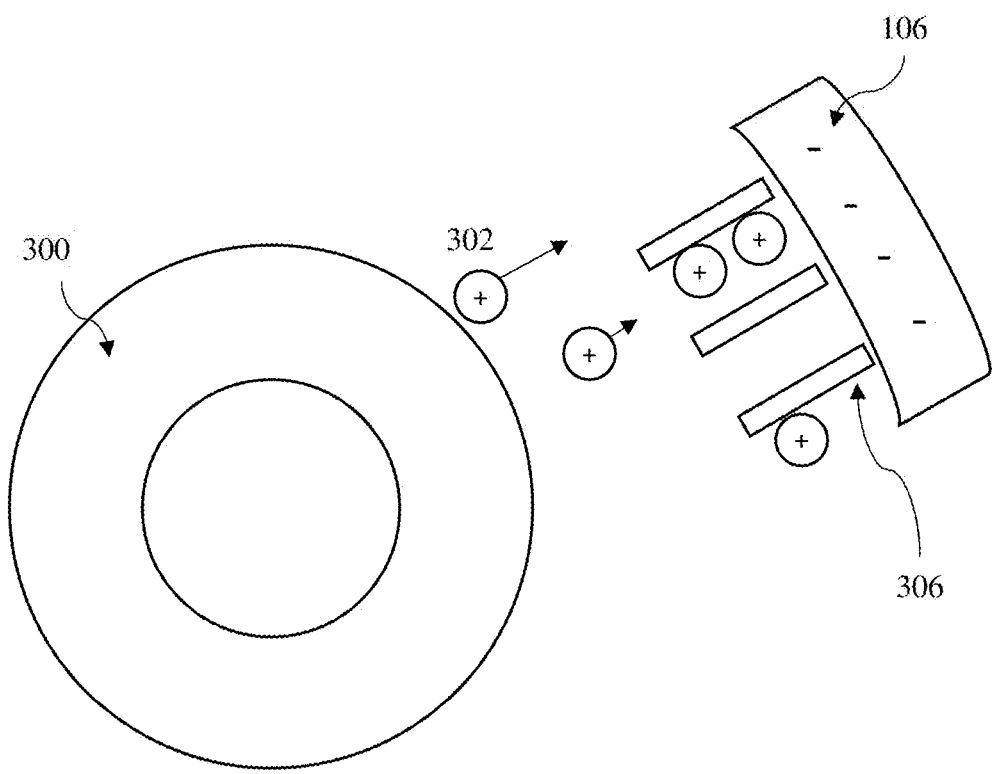
FIG. 3a shows a diagram of the capture surface of the system working with respect to a tire.
Figure 3B:
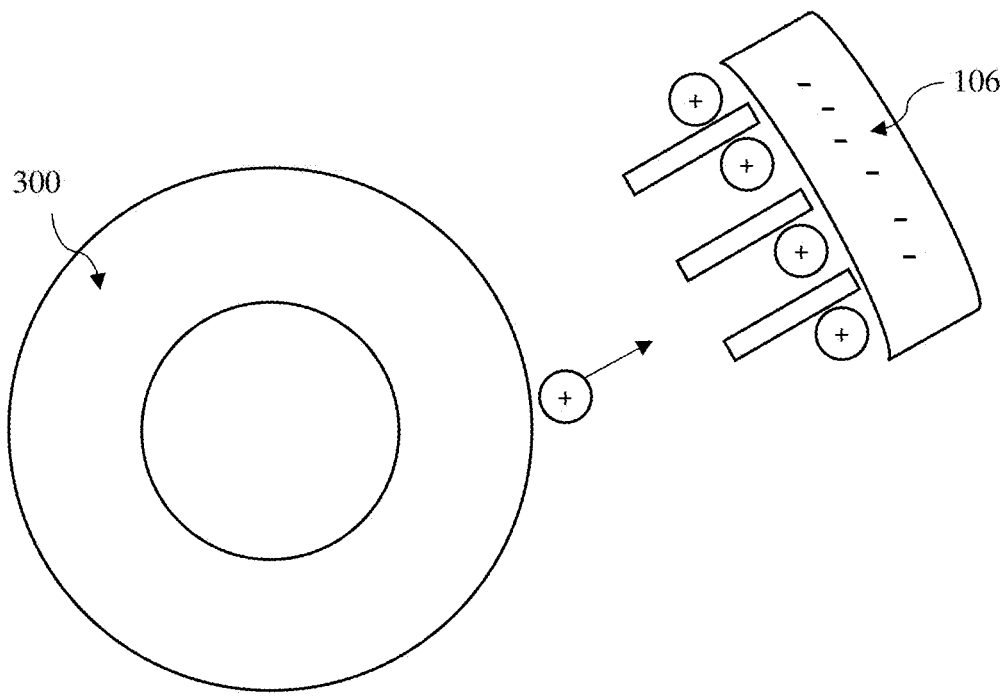
FIG. 3b shows a diagram of the system with buildup of captured particles on the capture surface.

FIGS. 3a and 3b show how the tire particle emissions are attracted to and captured by the capture surface. As the simple tire 300 rolls along the ground, the friction between the tire surface and the ground surface results in tire particles 302 being ripped off the body of the simple tire 300. These tire particles 302 are typically small. The triboelectric effect, which is a type of contact electrification, causes the tire particles 302 to become positively charged as they fly off the simple tire 300. The strength of the charges that these tire particles 302 have via the triboelectric effect depends on the materials of the simple tire 300 and the ground surface, on the surface roughness, on the temperature of the environment, and on other variables.

The capture surface 106 is powered to be oppositely charged as compared to the tire particles 302. As the tire particles 302 fly off the tire and are pulled toward the capture surface 106, the tire particles 302 are captured and held by the set of filters 306. In an embodiment of the invention, the capture surface may be part of a metal sheet, such as copper, which is electromagnetically charged to result in a static electromagnetic field that extends around the capture structure. In another embodiment of the invention, the capture surface 106 may be part of a housing that surrounds or envelops one or more electromagnetic coils. The coil or coils produce a static electromagnetic field that extends around the coils and around the housing. Various arrangements or structures may be used for the structure to which the capture surface 106 belongs and allowing the capture surface 106 to produce a static electromagnetic field which attracts tire particle emissions.

The electrical force of attraction between the tire particles 302 and the capture surface 106 may be inversely proportional to the square of the distance between them. The relationship between the force and distance follows the inverse square law which also known as Coulomb's law (2):

$$F = k_e \frac{q_1 q_2}{r^2} \quad (2)$$

where F is the force, $k_e$ is Coulomb's constant ($k_e \approx 8.988 \times 10^9$ N·m²·C⁻²) $q_1$ and $q_2$ are the charges and r is the distance between the charges. Typical road vehicles have a wheel to arch 108 distance of between 1 cm and 10 cm. The attractive electric force decreases as the distance between the tire particles 302 and the capture surface 106 increases. Therefore, it is preferable to arrange the system such that the capture surface is a few centimeters away from the wheel. Electrostatically charged tire particles that come off the tire may have a sufficient attraction to charged capture surfaces, e.g., charged copper plates, placed a few centimeters away from the wheel, such that the tire particles are captured onto the capture surfaces and not into the environment.

The filters 306 may be made of a translucent material, such as a translucent polymer. The filters may have a respective surface capable of capturing the tire particles in place. The surface of the filters may be porous and/or may have a rough surface which hold the captured tire particles in place. The filters 306 may in at least some embodiments be attached to the capture structure and to the capture surface 106 via an adhesive connection or via another type of mechanical connection.

FIG. 3b shows a scenario where a buildup level of captured tire particles of the set of filters 306 has increased to approach a saturation level. This buildup results in a screening effect of the static electromagnetic field of the capture plate and in a reduction of the resultant attractive strength of the capture surface 106. The level of particle buildup is monitored by the computer system 114. As the level of particle buildup of the filters 306 increases, the computer system 114 may modify the power supplied to the capture surface 106 so that the charge of the capture surface 106 and a strength of the electromagnetic field around the capture surface 106 are increased so that tire particles 302, which themselves may be charged, may be captured more effectively.

The dynamic allocation of power to the capture surface 106 may be achieved by drawing additional power from a backup power source 112. The backup power source 112 allows the strength of the electromagnetic field of the capture surface 106 to be maintained or increased, depending on the particle buildup level of the filters 306 or on varying environmental conditions which otherwise might reduce the strength of the electromagnetic field. In an embodiment of the present invention, the backup power source 112 may be a battery connected to the capture surface 106 via an electrical connecting line. The backup power source 112 may also have a communicative connection to the computer system 114. In another embodiment of the present invention, the backup power source 112 may be an alternator of the vehicle.

The computer system 114 is programmed to adjust and increase the charge of the capture surface 106 when the particle buildup level on the filters 306 increases and starts to diminish the strength of the electromagnetic field of the capture surface 106. This diminishment may be referred to as a screening of the capture surface 106. Adjustment of the electric field strength of the capture surface 106 may be referred to as calibration of the electric field strength.

Figure 4:
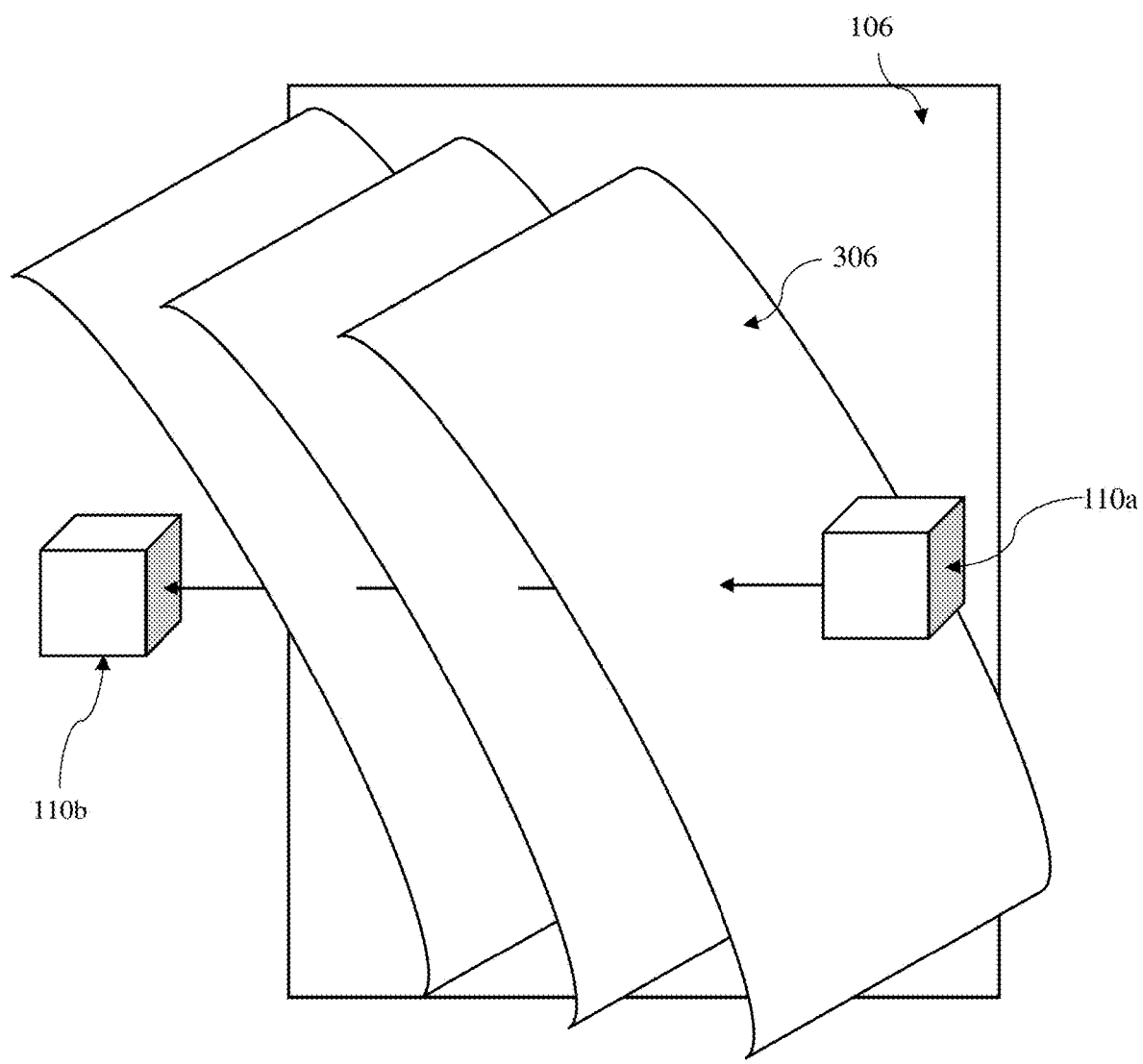
FIG. 4 is a schematic diagram of the capture surface, the set of filters, and a photodetector system for monitoring a particle buildup level on the set of filters.

One embodiment for monitor the particle buildup level may include using a photodetector 110. FIG. 4 shows an example embodiment which includes a capture surface 106, a set of filters 306, and first and second photodetector components 110a, 110b that are arranged to enable monitoring the captured particle buildup level of the set of filters 306. The filters 306 may, as shown in the embodiment of FIG. 4, be arranged orthogonally to the capture surface 106. The capture surface 106 provides an electromagnetic field that attracts tire particle emissions. The photodetector 110 of FIG. 1 may include a first photodetector component 110a and a second photodetector component 110b (both shown in FIG. 4). The first photodetector component 110a may generate a light beam and transmit the light beam toward the filters 306. The second photodetector component 110b may receive the light beam that was generated by the first photodetector component 110a and that passed through the filters 306.

The photodetector 110 may include a light gate system, may be configured to generate a light beam, and may be configured to pass the light beam toward the filters 306. When the filters 306 are translucent, the light beam may pass through the filters 306. The level of the light beam transmittance is used as an indication of the captured particle buildup level of the filters. As the captured particles buildup on the filters 306 in an increasing amount or level, the less light will pass through the successively arranged filters. Each individual filter of the set will block some light so that a reduced amount succeeds in passing through the entire set of filters 306 and being received by the second photodetector component 110b which may be a light receiver. The light may be generated by the first photodetector component 110a which may be a light generator. Thus, by measuring the level of the light the photodetector 110 may monitor the particle buildup level. The photodetector 110 may send a signal representing the light transmittance level to the computer system 114 which the computer system 114 may evaluate and then use as a basis for adjusting the amount of supplementary power fed to the capture surface 106 via the backup power source 112. Other photodetector arrangements may be used alternatively to the arrangement shown in FIG. 4 which has the light generator and the light receiver.

In another embodiment, the computer system 114 is programmed to adjust the amount of supplementary power fed to the capture surface 106 when external conditions effect the rate of power output from the triboelectric generator 100. If the external conditions decrease the power output from the triboelectric generator 100 and signals indicate same to the computer system 114, the computer system 114 may adjust the backup power source 112 to send more power from the backup power source 112 to the capture surface 106 so that the strength of the electromagnetic field of the capture surface 106 may be maintained. External conditions may include weather conditions, road conditions, and the condition of the tire. Signals from other sensors or computers may be representative of these external conditions and may be sent to the computer system 114. The computer system 114 may evaluate one or more of these external condition signals as a basis for adjusting the amount of supplementary power fed to the capture surface 106 via the backup power source 112.

In another embodiment, the monitoring of the strength of the electromagnetic field of the capture surface 106 may be used by the computer system 114 to control a level of supplemental power flow from a backup power source 112. The strength of the electromagnetic field of the capture surface 106 may be indicative of the particle buildup level and a possible saturation of the capture surface 106. For example, if adding additional charge from the backup power source 112 does not lead to a corresponding increase in the strength of the electromagnetic field, this non-increase or non-corresponding increase is indicative of a particulate layer screening the charge from the capture surface 106. An electromagnetic field strength sensor 118 which may be attached in the vicinity of the capture structure may be used to measure the strength of the electromagnetic field of the capture surface 106. The electromagnetic field strength sensor 118 may be communicatively connected to the computer system 114 to send a signal representing the electromagnetic field strength. This use of electromagnetic field strength monitoring may be used alongside or in place of the photodetector system to monitor the particle buildup level of the filters 306 and of the capture surface 106.

Via these various embodiments which allow the computer system 114 to control the supplemental flow of power to the capture surface 106, the electric field generated around the capture surface may be said to be an adjustable electric field.

Figure 5A:
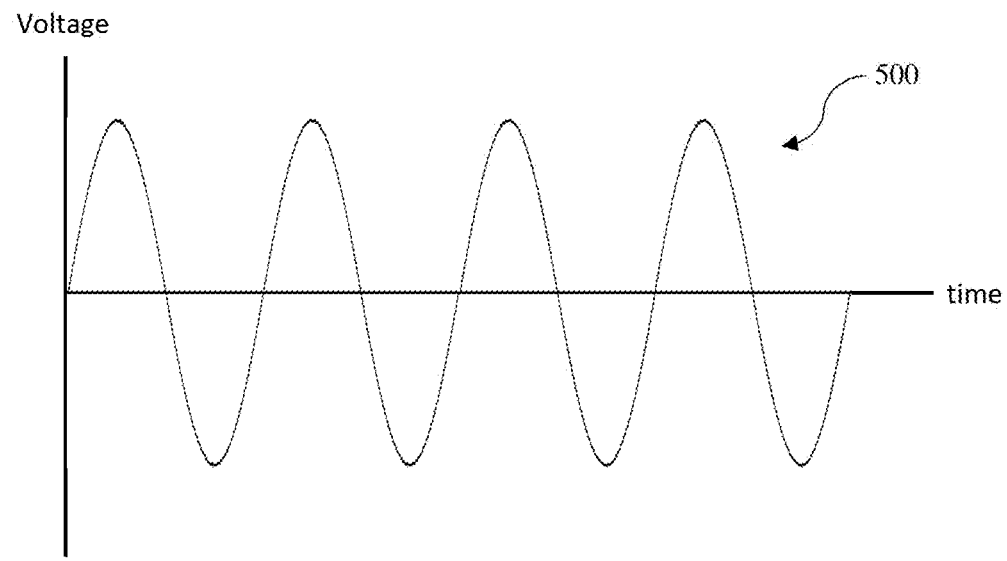
FIG. 5a is a first graph illustrating the output voltages from a triboelectric generator depending on external conditions.

FIG. 5a shows an illustrative output graph showing the voltage produced by the triboelectric generator 100 over time. The output voltage alternates in time due to the cyclical nature of the triboelectric effect as demonstrated in FIG. 2. The computer system 114 may continuously monitor the output voltage of the triboelectric generator 100 and compare it to the expected voltage output, to determine whether the strength of the capture surface 106 needs to be adjusted. The computer system 114 may calculate the expected voltage output using the vehicle speed and the vehicle load. The computer system 114 may receive input signals from other vehicle components, with these input signals representing the vehicle speed and the vehicle load.

Figure 5B:
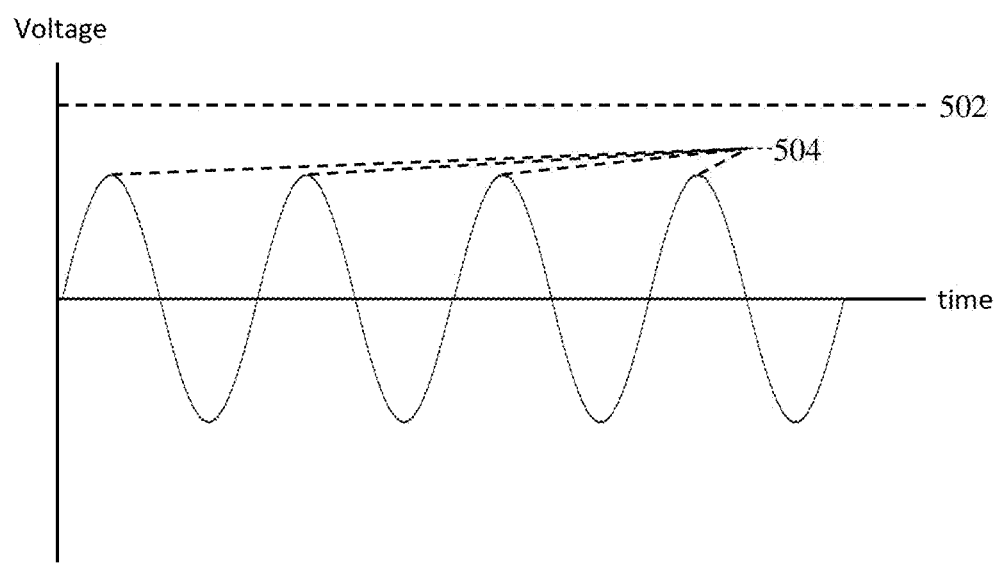
FIG. 5b is a second graph illustrating the output voltages from a triboelectric generator depending on external conditions.

If the peak output voltage 504 (shown in FIG. 5b) is lower than the expected voltage output 502, this difference may indicate that external conditions may be effecting the efficacy of the triboelectric generator 100, and therefore the strength of the electromagnetic field of the capture surface 106. Therefore, the computer system 114 may communicate with the backup power source 112 and cause the backup power source 112 to transmit more power to the capture surface 106. This use of supplemental power may help ensure the tire particle emissions are captured as desired.

Alternatively, the output voltage may be equal to or higher than the expected output due to external conditions. In this scenario, the computer system 114 may send a signal to the backup power source 112 causing the backup power source 112 to reduce or shut off the power that is being transmitted from the backup power source 112 to the capture surface 106. This reduction or shut off conserves power and makes sure the charge structure and the capture system do not unnecessarily waste power when lower power amounts are sufficient for the system to function correctly.

Figure 6A:
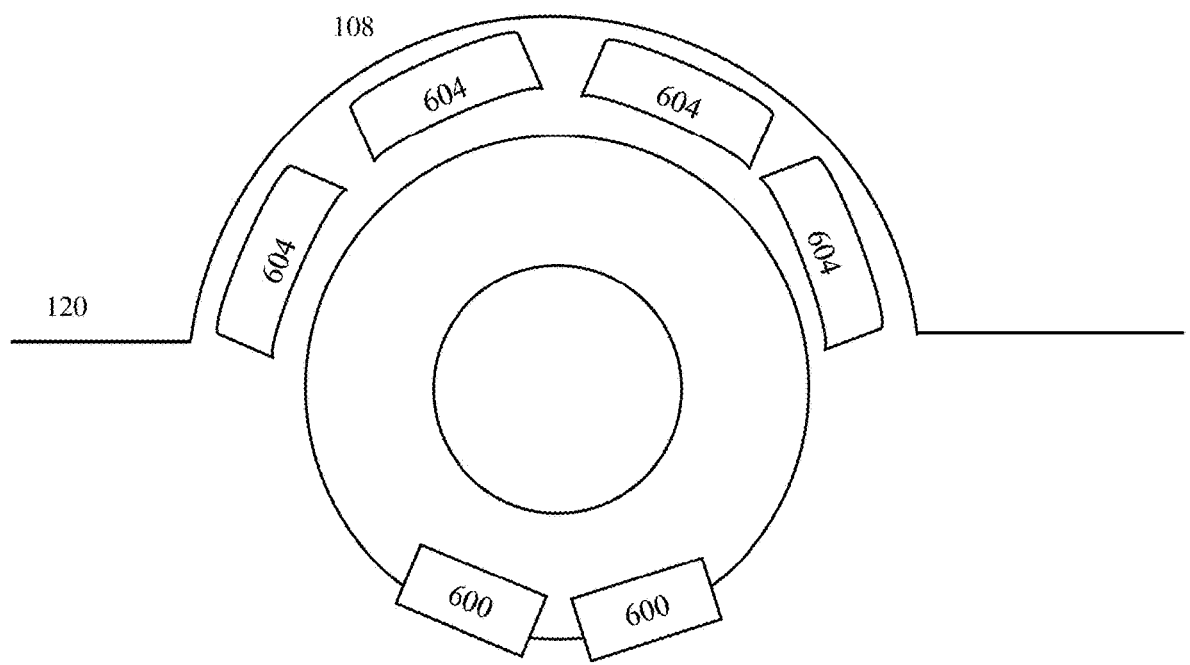
FIG. 6a shows a diagram of an embodiment of the system with multiple triboelectric generators embedded within the tire.

FIG. 1 shows an embodiment of the invention where the whole surface of the tire acts as a single layer with a strong electron affinity and the system includes a single triboelectric generator 100. In another embodiment of the invention, the system may include multiple triboelectric generators. FIG. 6a shows an alternative embodiment with multiple triboelectric generators 600, which are embedded within another tire. These multiple triboelectric generators 600 may be connected to multiple capture structures 604 arranged around the wheel arch of a vehicle. In an alternative embodiment, the multiple triboelectric generators 600 may each supply electric current to a single capture surface 106.

In FIG. 6a, the shown tire includes multiple surface sections that generate output power. The more surface sections that the system includes, the more power the multiple triboelectric generators 600 will produce.

Various embodiments of the system may include alternative positioning of the components of the system.

A respective functioning system may be placed on multiple wheels of the vehicle including on all wheels of the vehicle.

Figure 6B:
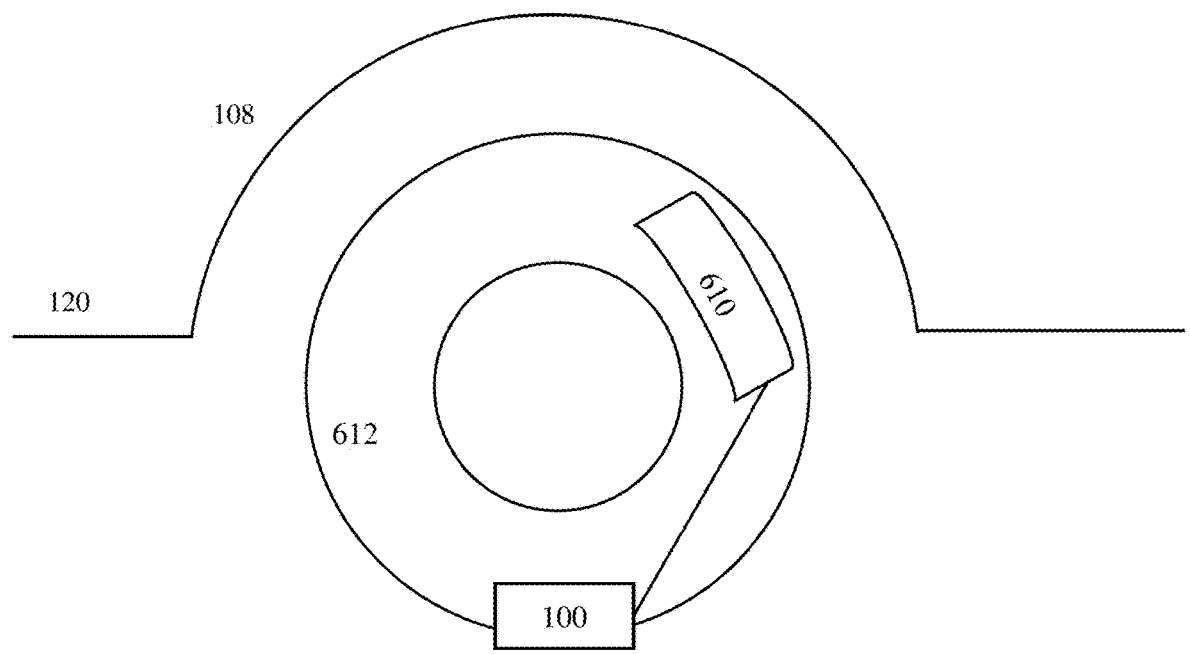
FIG. 6b shows a diagram of another embodiment of the system with a triboelectric generator and a capture surface both embedded within the tire.

In another embodiment of the present invention, a particle capture surface 610 may be arranged directly on the wheel/tire. The particle capture surface 610 may receive electric current generated by a triboelectric generator 100 that is also embedded within the same wheel/tire. An electric connecting line may run through the wheel/tire to electrically connect the particle capture surface 610 to the triboelectric generator 100. FIG. 6b shows a triboelectric generator 608 connected to a particle capture surface 610. The particle capture surface 610 may in one embodiment be disposed behind the wheel hub. The particle capture surface 610 itself may be small and thin so as to not prevent normal rotation operation of the wheel As described earlier for other embodiments, the capture surface 106 may alternatively be embedded into the wheel arch of the vehicle.

In an embodiment of the present invention, the computer 1010 is arranged within the vehicle.

In an alternative embodiment of the present invention, the computer 1010 is located on a remote server. For this alternative embodiment, the data from the photodetector 110 and the signals from the voltage output sensor 116 and the electromagnetic field strength sensor 118 may be transmitted via a communication network to the remote server and the computer 1010 in the remote server. In this alternative embodiment, the computer 1010 may analyze and control multiple vehicles from a central service.

Embodiments may include the system alone so that the system may be retrofitted onto existing vehicle/tire combinations. Embodiments of the system may include the tire with the triboelectric generator embedded within the tire. Embodiments may also include an entire vehicle with a vehicle body and one or more tires bearing the vehicle body. Other system components may be embedded within the tire and in some instances in the vehicle body.

FIG. 7a shows an operational flowchart illustrating a tire particle emission capture process 700 according to at least one embodiment. Structure that is used to perform the steps of the tire particle emission capture process 700 is described throughout this disclosure.

In a step 702 of the tire particle emission capture process 700, an electric current is generated via a triboelectric generator 100 at a tire. The disclosure above explains various embodiments of structures which may be implemented as a triboelectric generator 100 at a tire to generate an electric current. For example, FIGS. 2a-2d and the corresponding description disclose an example of how step 702 may be carried out.

In a step 704 of the tire particle emission capture process 700, the electric current is passed to a capture surface 106 via a connecting line. FIG. 1 showed an example of a first electrical connecting line 122 configured to pass the electric current from the triboelectric generator 100 to the capture surface 106. The structure of the connecting lines suitable to carry out this step is discussed in this disclosure. The electric current that is passed in step 704 may be the electric current that is generated in step 702.

In a step 706 of the tire particle emission capture process 700, an electric field is generated around the capture surface 106 using the electric current. The electric current that is used in step 706 may be that electric current that was passed in step 704. As the capture structure receives the electric current, the capture structure and the capture surface 106 become charged. The space surrounding the charged object, in this instance the capture surface 106, an electric field is established in the space surrounding the charged object. The charge of the capture surface 106 alters the space, in particular the air space, surrounding the capture surface 106.

In a step 708 of the tire particle emission capture process 700, tire emissions from the tire are captured in the capture surface 106 with aid of the electric field. This electric field may be the electric field that was generated in step 706. FIGS. 3a-3b show an example of how tire particles 302 which may be charged may be attracted to the capture surface 106 via the electric field and may be captured in the capture surface 106, e.g., may be captured in filters 306 that are connected to the capture surface 106.

In a step 710 of the tire particle emission capture process 700, one or more control signals are received at a computer system 114.

These one or more control signals received in step 710 may include a voltage output signal representing a voltage output of the at least one triboelectric generator Such a voltage output signal may be generated and sent via a voltage output sensor 116 which is shown in FIG. 1 and described previously. FIG. 1 shows a communicative connection, e.g., a wired or wireless connection, between the voltage output sensor 116 and the computer system 114. This communicative connection allows the voltage output sensor 116 to send a voltage output signal to the computer system 114.

These one or more control signals received in step 710 may also or alternatively include a photodetector signal representing a received light beam that was transmitted through a set of filters 306. This photodetector signal may be generated and sent via a photodetector 110 which is shown in FIG. 1 and whose operation is described in more detail with respect to FIG. 4. FIG. 1 shows a communicative connection, e.g., a wired or wireless connection, between the photodetector 110 and the computer system 114. This communicative connection allows the photodetector 110 to send a photodetector signal to the computer system 114.

These one or more control signals received in step 710 may also or alternatively include an electric field strength signal representing a strength of the electric field generated around the at least one capture surface 106. This electromagnetic field strength signal may be generated and sent via an electromagnetic field strength sensor 118 shown in FIG. 1 and whose operation is described in this disclosure. FIG. 1 shows a communicative connection, e.g., a wired or wireless connection, between the electromagnetic field strength sensor 118 and the computer system 114. This communicative connection allows the electromagnetic field strength sensor 118 to send an electromagnetic field strength signal to the computer system 114.

These one or more control signals received in step 710 may also or alternatively include an external condition signal representing one or more external conditions effecting the electric current generated via the at least one triboelectric generator.

These one or more control signals received in step 710 may also or alternatively include a speed signal representing a speed of a vehicle which the tire is bearing. This speed signal may be received via a wired or wireless communication from a main computer component of the vehicle or from an additional speedometer near the computer system 114.

In a step 712 of the tire particle emission capture process 700, a supplemental power flow to the capture surface 106 is adjusted based on the one or more control signals that were received in step 710. The computer system 114 which received the one or more control signals in step 710 may perform this adjustment of step 712. This adjustment may be performed by the computer system 114 sending a control signal to the backup power source 112 so that an electric flow from the backup power source 112 to the capture surface 106 is controlled, e.g., increased or reduced. FIG. 1 shows a communicative connection, e.g., a wired or wireless connection, between the computer system 114 and the backup power source 112. This connection allows the computer system 114 to send a control signal to the backup power source 112. This adjustment of step 712 may include changing the amount of electric power that is flowing through the second electrical connecting line 124 to the capture surface 106.

The adjustments associated with steps 710 and 712 may be repeated continuously during operation of the system and vehicle.

FIG. 7b is an operational flowchart illustrating a photodetector-aided electric field strength adjustment process 720 according to at least one embodiment. Structure that is used to perform the steps of the photodetector-aided electric field strength adjustment process 720 is described throughout this disclosure.

In a step 722 of the photodetector-aided electric field strength adjustment process 720, a light beam is generated via a photodetector 110. FIG. 4 shows an example that a first photodetector component 110a of the photodetector 110 may generate a light beam.

In a step 724 of the photodetector-aided electric field strength adjustment process 720, the light beam is transmitted through a set of filters 306. The filters 306 may be formed from a translucent material, so that light may pass through unless an external substance, such as tire particles, build up on the surface of the filters 306 which would block or reduce that light transmission. FIG. 4 shows the light passing through the filters 306. This light beam may be that light beam that was generated in step 722.

In a step 726 of the photodetector-aided electric field strength adjustment process 720, the photodetector 110 receives the light beam that passes through the filters 306. FIG. 4 shows an example that a second photodetector component 110b of the photodetector 110 may receive a generated light beam that has passed through the filters 306 that are attached to the capture surface 106.

In a step 728 of the photodetector-aided electric field strength adjustment process 720, the photodetector 110 sends to a computer system 114 a signal representing the received light beam. FIG. 1 shows a communicative connection, e.g., a wired or wireless connection, between the photodetector 110 and the computer system 114. This connection allows the photodetector 110 to send a photodetector signal to the computer system 114.

In a step 730 of the photodetector-aided electric field strength adjustment process 720, the computer system 114 determines a particle buildup level on the filters 306 based on the signal. This signal used in step 730 may be the signal sent in step 728 and that was received by the computer system 114. The computer system 114 may use light amount transmission data to determine a particle buildup level. The light amount transmission data may indicate that light transmission amounts that are higher are associated with lower particle buildup levels. The photodetector signal may include an amount of strength of the initial light beam generated. The step 730 may include the computer system 114 comparing the strength of the initial light beam generated to the strength of the light beam received. A reduction in this strength may correspond to particle buildup level. Natural light beam strength reduction data that occurs based on the translucent filters alone without any particle buildup may be stored in the computer system 114 and compared to signals received from the photodetector 110 during operation of the system. Increases in reduction may be interpreted by the computer system 114 as being caused by particle buildup level, e.g., by buildup of tire emission particles that have been captured by the filters 306.

In a step 732 of the photodetector-aided electric field strength adjustment process 720, a supplementary power flow to the capture surface 106 is adjusted based on the particle buildup level. The computer system 114 which received the one or more control signals in step 730 may perform this adjustment of step 732. This adjustment may be performed by the computer system 114 sending a control signal to the backup power source 112 so that an electric flow from the backup power source 112 to the capture surface 106 is controlled, e.g., increased or reduced. FIG. 1 shows a communicative connection, e.g., a wired or wireless connection, between the computer system 114 and the backup power source 112. This connection allows the computer system 114 to send a control signal to the backup power source 112. This adjustment of step 712 may include changing the amount of electric power that is flowing through the second electrical connecting line 124 to the capture surface 106.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing system", "processing module", "processing circuit", "processor", and/or "processing unit" may be used interchangeably and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be located in a distributed manner (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

Figure 8:
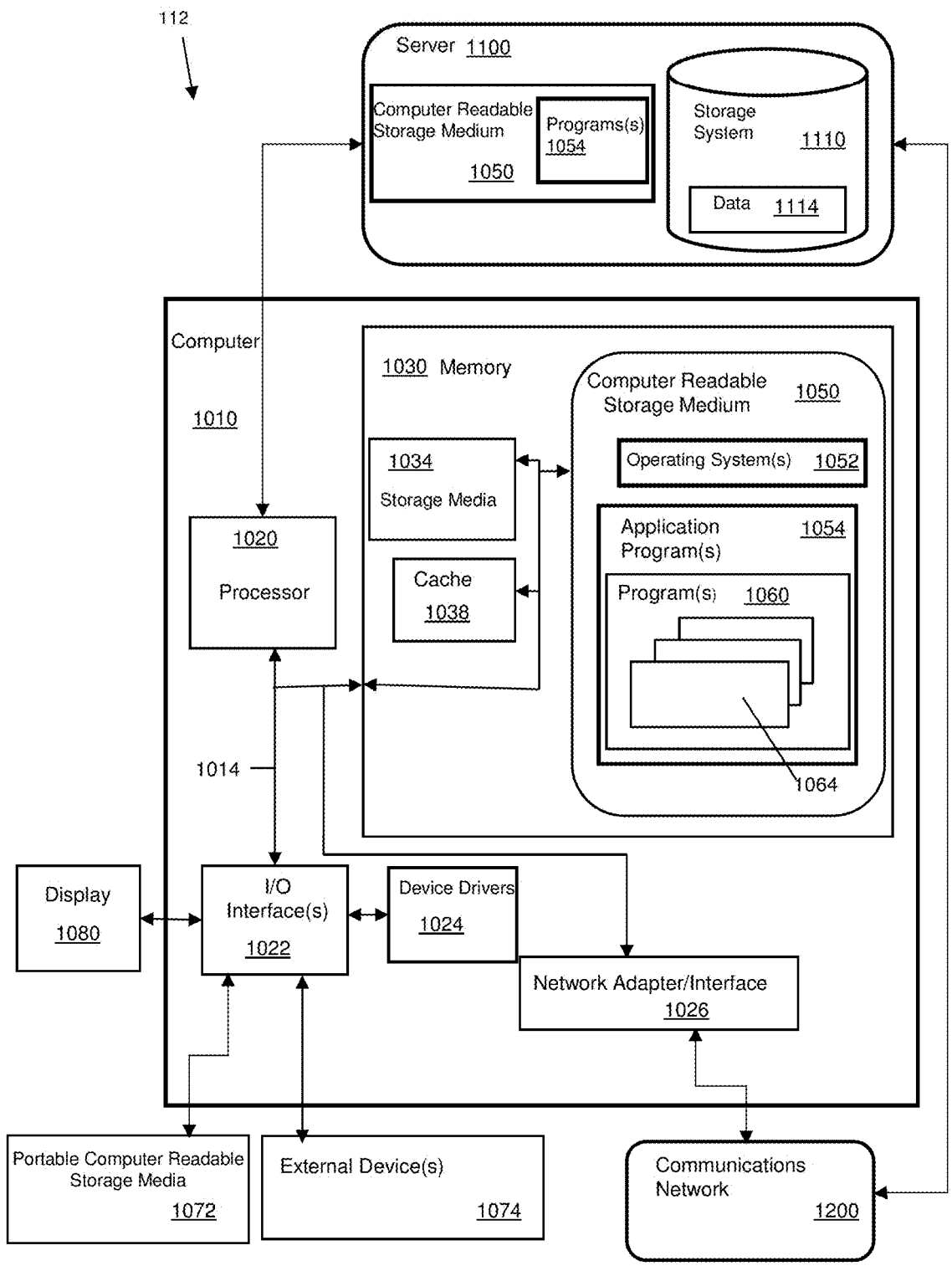
FIG. 8 is a block diagram depicting the hardware components of a system in accordance with an embodiment of the invention.
Figure 9:
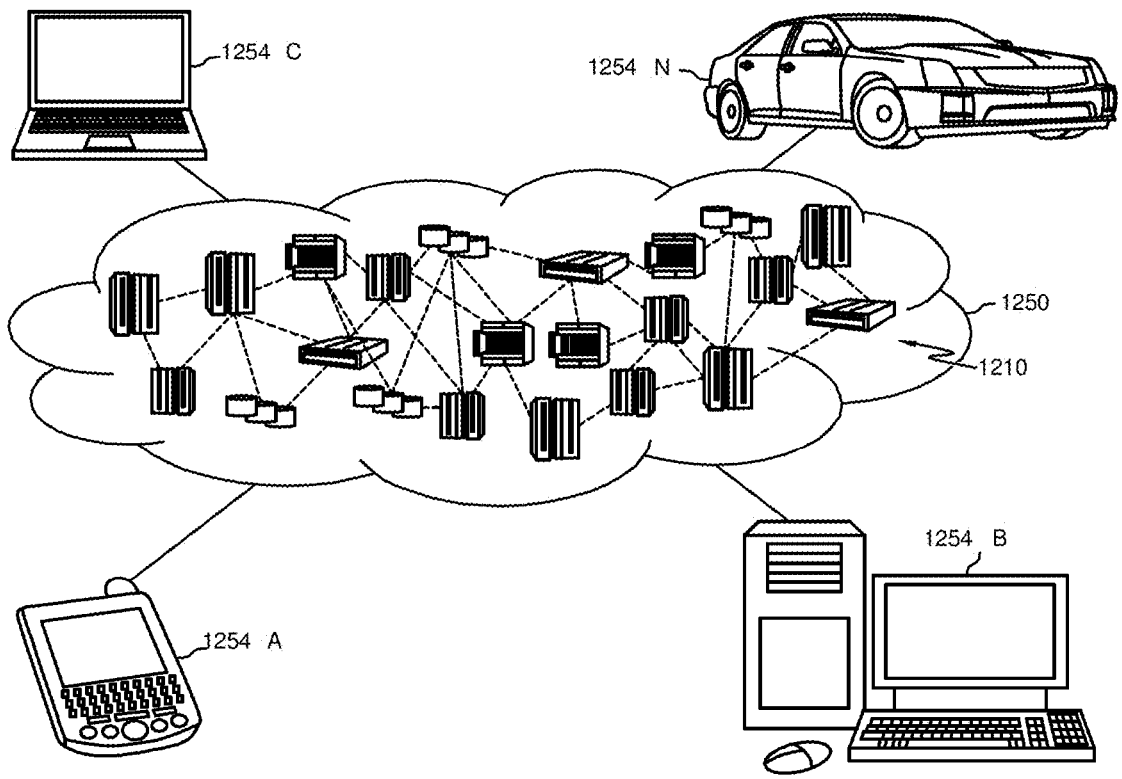
FIG. 9 is a functional block diagram depicting a cloud computing environment, in accordance with an embodiment of the invention.

The computer 1010 may include internal and external hardware components, as described in further detail below with respect to FIG. 8. It should be appreciated that FIG. 8 provides only an illustration of one implementation and does not imply any limitations with regard to the environments in which different embodiments may be implemented. Many modifications to the depicted environment may be made. In other embodiments, the computer 1010 may operate in a cloud computing environment, as depicted in FIGS. 8 and 9.

Referring to FIG. 8, a computer system 114 includes a computer 1010 shown in the form of a generic computing device. The method of the present invention, for example, may be embodied in a program(s) 1060 (FIG. 8) embodied on a computer readable storage device, for example, generally referred to as memory 1030 and more specifically, computer readable storage medium 1050 as shown in FIG. 8. For example, memory 1030 can include storage media 1034 such as RAM (Random Access Memory) or ROM (Read Only Memory), and cache memory 1038. The program 1060 is executable by the processor 1020 of the computer 1010 (to execute program steps, code, or program code). Additional data storage may also be embodied as a storage system 1110 which may be a database and which can include data 1114. The computer 1010 and the program 1060 shown in FIG. 8 are generic representations of a computer and program that may be local to a user, or provided as a remote service (for example, as a cloud based service), and may be provided in further examples, using a website accessible using the communications network 1200 (e.g., interacting with a network, the Internet, or cloud services).

It is understood that the computer 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer 1010 and a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 8 as program modules 1064. The program 1060 and program modules 1064 can execute specific steps, routines, sub-routines, instructions or code, of the program.

Embodiments of the present disclosure can be run locally on a device such as a vehicle, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 8, the computer system 114 may include the computer 1010 shown in the form of a general-purpose computing device with illustrative periphery devices. The components of the computer 1010 may include, but are not limited to, one or more processors 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer or server), and can include both volatile and non-volatile media, as well as removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processor 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods described herein may, for example, be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The program 1060 may be executed to perform the adjustment of the supplemental power flow for the particle charge surface. The one or more programs 1060 are stored in memory 1030 and are executable by the processor 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processor 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 9 are intended to be illustrative only and that computing nodes 1210 and cloud computing environment 1250 can communicate with any type of computerized device over any type of network and/or network addressable connection (e.g., using a web browser). The computer 1010 or components of the tire particle capture system may be one of the cloud computing nodes 1210.

Figure 10:
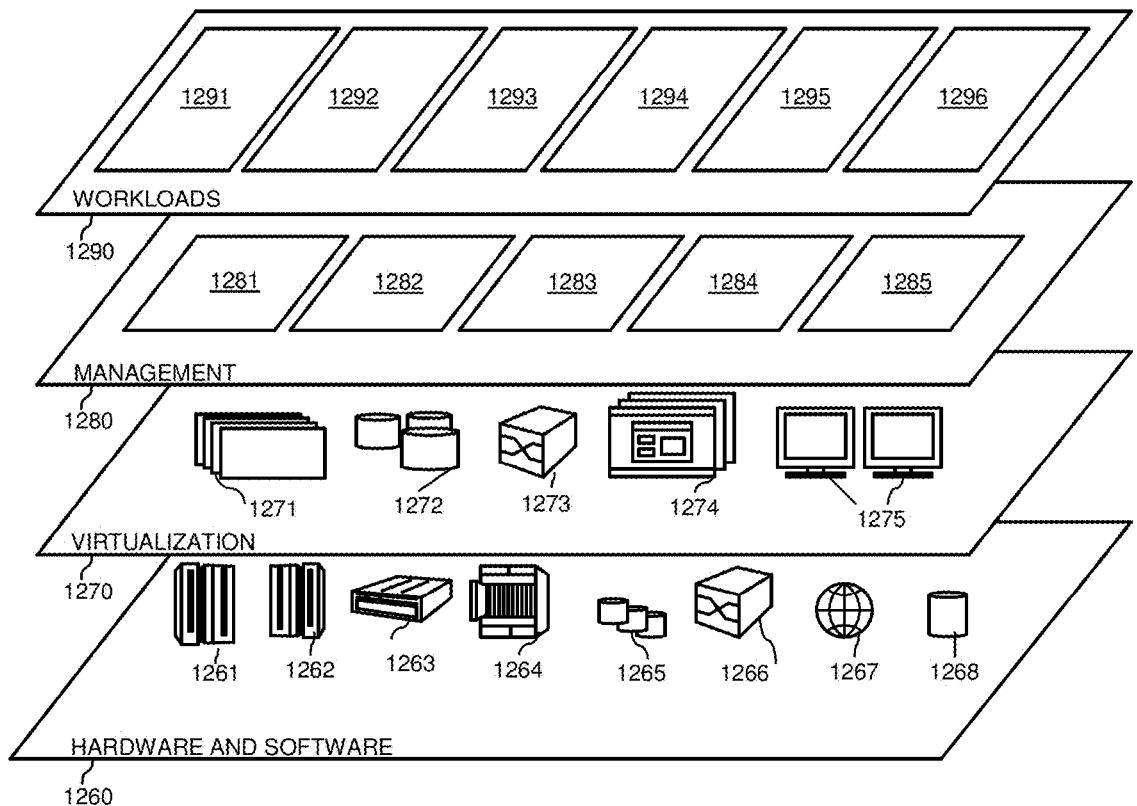
FIG. 10 is a diagram depicting abstraction model layers provided by the cloud computing environment of FIG. 9, in accordance with an embodiment of the invention.

Referring now to FIG. 10, a set of functional abstraction layers provided by cloud computing environment 1250 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include mapping and navigation 1291; software development and lifecycle management 1292; virtual classroom education delivery 1293; data analytics processing 1294; transaction processing 1295; and adjusting supplemental power flow for the particle charge surface 1296.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for capturing particle emissions from a tire of a vehicle, the system comprising:
   at least one triboelectric generator configured to generate an electric current;
   at least one capture surface configured to have an electric field;
   a first electrical connecting line connecting the at least one triboelectric generator to the at least one capture surface and configured to pass to the at least one capture surface the electric current generated via the at least one triboelectric generator, the passed electric current being used by the at least one capture surface to generate the electric field;
   a set of filters attached to the at least one capture surface;
   a backup battery;
   a second electrical connecting line connecting the backup battery to the at least one capture surface;
   a first sensor; and
   a computer system comprising a processor, a computer-readable memory, and program instructions stored on the computer-readable memory for execution by the processor to cause the processor to perform:
      receiving a signal from the first sensor; and
      adjusting, based on the signal, a supplementary flow of power from the backup battery to the at least one capture surface via the second electrical connecting line.

2. The system of claim 1, wherein the first sensor is configured to measure a voltage output of the at least one triboelectric generator that is passed through the first electrical connecting line.

3. The system of claim 2, wherein the received signal is a measured voltage output from the first sensor;
   wherein the program instructions when executed by the processor further cause the processor to compare the received measured voltage output to an expected voltage output; and
   wherein the adjusting of the supplementary flow of power is based on the comparing.

4. The system of claim 1, wherein the first sensor comprises a photodetector.

5. The system of claim 4, wherein the set of filters comprise a translucent material.

6. The system of claim 4,
   wherein the received signal is based on a received light beam that was transmitted through the set of filters;
   wherein the program instructions when executed by the processor further cause the processor to determine, based on the signal, a buildup level of particles on the set of filters; and
   wherein the adjusting of the supplementary flow of power is based on the determined buildup level.

7. The system of claim 1, wherein the first sensor comprises a field strength sensor configured to measure a strength of the electric field generated via the at least one capture surface.

8. The system of claim 7,
wherein the received signal is a strength signal from the field strength sensor; and
wherein the adjusting of the supplementary flow of power is based on the received strength signal.

9. The system of claim 1,
wherein the received signal relates to external conditions.

10. The system of claim 1, wherein the filters have surface properties enabling the filters to hold captured particles.

11. The system of claim 1, further comprising a tire, wherein the at least one triboelectric generator is embedded within the tire.

12. A vehicle comprising:
a vehicle body;
the system of claim 1, the system being embedded within or connected to the vehicle body; and
a first tire connected to the vehicle body, the at least one triboelectric generator of the system being embedded within the first tire;
wherein the at least one capture surface uses the electric field to capture particle emissions from the first tire.

13. A method for pollution control, the method comprising:
generating an electric current via at least one triboelectric generator embedded in a tire of a vehicle and via a triboelectric effect from frictional motion resulting between at least one section of a surface of the tire and a ground surface;
passing the generated electric current via a first electrical connecting line to at least one capture surface arranged near the tire, the at least one capture surface being connected to a vehicle body of the vehicle;
generating an electric field around the at least one capture surface using the electric current passed to the at least one capture surface;
capturing tire emissions from the tire in a set of filters attached to the at least one capture surface as the tire emissions are attracted via the generated electric field;
receiving, via a computer system, one or more control signals; and
adjusting, via the computer system, a supplementary power flow to the at least one capture surface based on the received one or more control signals, the supplementary power flow coming via a backup battery and via a second electrical connecting line connecting the backup battery to the at least one capture surface.

14. The method of claim 13,
wherein the one or more control signals are selected from a group consisting of:
a voltage output signal representing a voltage output of the at least one triboelectric generator,
a photodetector signal representing a received light beam transmitted through the set of filters,
an electric field strength signal representing a strength of the electric field generated around the at least one capture surface,
an external condition signal representing one or more external conditions affecting the electric current generated via the at least one triboelectric generator, and
a speed signal representing a speed of a vehicle which the tire is bearing.

15. The method of claim 14, wherein the one or more control signals comprise an external condition signal representing one or more external conditions affecting the electric current generated via the at least one triboelectric generator; and
wherein the one or more external conditions are selected from another group consisting of a weather condition, a road condition, and a tire condition.

16. The method of claim 14, wherein the one or more control signals comprise a photodetector signal representing a received light beam transmitted through the set of filters;
wherein the method further comprises:
generating the light beam via a photodetector;
transmitting the generated light beam through a translucent material of the set of filters; and
receiving, via the photodetector, the transmitted light beam that has passed through the translucent material; and
wherein captured particles on the set of filters affect an amount of the generated light beam that passes through the translucent material and that is received by the photodetector.

17. The method of claim 14, wherein the one or more control signals comprise a voltage output signal representing a voltage output of the at least one triboelectric generator.

18. The method of claim 14, wherein the one or more control signals comprise an electric field strength signal representing a strength of the electric field generated around the at least one capture surface.

19. The method of claim 14, wherein the one or more control signals comprise a speed signal representing a speed of a vehicle which the tire is bearing.

20. The method of claim 13, wherein the at least one triboelectric generator comprises multiple triboelectric generators embedded within the tire and contributing to the generating of the electric current from the frictional motion resulting between the surface of the tire and the ground surface.

* * * * *